(12) United States Patent
Rastogi

(10) Patent No.: US 12,425,472 B2
(45) Date of Patent: Sep. 23, 2025

(54) METHOD TO PRIORITIZE AND OFFLOAD MOBILE EDGE CLOUD TRAFFIC IN 5G

(71) Applicant: Telefonaktiebolaget LM Ericsson (publ), Stockholm (SE)

(72) Inventor: Nupur Rastogi, Austin, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 37 days.

(21) Appl. No.: 18/558,189

(22) PCT Filed: Jun. 4, 2021

(86) PCT No.: PCT/IB2021/054930
§ 371 (c)(1),
(2) Date: Oct. 30, 2023

(87) PCT Pub. No.: WO2022/254246
PCT Pub. Date: Dec. 8, 2022

(65) Prior Publication Data
US 2024/0223644 A1    Jul. 4, 2024

(51) Int. Cl.
*G06F 13/00*    (2006.01)
*H04L 67/10*    (2022.01)
*H04W 4/50*    (2018.01)

(52) U.S. Cl.
CPC ............... *H04L 67/10* (2013.01); *H04W 4/50* (2018.02)

(58) Field of Classification Search
CPC ......... H04L 67/10; H04L 43/02; H04L 47/83; H04W 4/50; H04W 28/08; H04W 28/02; H04W 28/0284

USPC ........ 709/203, 238–241, 201, 223–224, 235, 709/232
See application file for complete search history.

(56) References Cited

U.S. PATENT DOCUMENTS

| 10,609,546 B2* | 3/2020 | Panchal ................. H04L 47/56 |
| 10,999,766 B2* | 5/2021 | He ........................ H04L 47/822 |
| 11,166,211 B2* | 11/2021 | Caceres ................. H04W 8/08 |
| 11,330,470 B2* | 5/2022 | He ..................... H04W 28/0983 |
| 2020/0053546 A1 | 2/2020 | Panchal et al. |
| 2020/0275313 A1 | 8/2020 | He et al. |

(Continued)

OTHER PUBLICATIONS

International Search Report and Written Opinion, Application No. PCT/IB2021/054930, Mar. 3, 2022, 10 pages.

*Primary Examiner* — Kenneth R Coulter
(74) *Attorney, Agent, or Firm* — Nicholson De Vos Webster & Elliott LLP

(57) ABSTRACT

A resource manager in a mobile communication network has a method to orchestrate execution of a first class of latency sensitive applications and a second class of latency sensitive applications where the second class of latency sensitive applications are less latency sensitive than the first class of latency sensitive applications. The method includes determining whether aggregated resource usage has exceeded or is predicted to exceed a threshold usage level for a first multi-access edge cloud (MEC), obtaining a list of the second class of latency sensitive applications executing at the first MEC, determining whether a second MEC in a cluster with the first MEC has resources to execute at least one application from the list of the second class of latency sensitive applications, and transferring a state of a selected application of the second class of latency sensitive applications to the second MEC.

12 Claims, 12 Drawing Sheets

(56) References Cited

U.S. PATENT DOCUMENTS

2021/0014755 A1   1/2021  Caceres et al.
2021/0204170 A1*  7/2021  He ......................... H04L 47/83

* cited by examiner

METHOD TO PRIORITIZE AND OFFLOAD MOBILE EDGE CLOUD TRAFFIC IN 5G

CROSS-REFERENCE TO RELATED APPLICATIONS

This application is a National stage of International Application No. PCT/IB2021/054930, filed Jun. 4, 2021, which is hereby incorporated by reference.

TECHNICAL FIELD

Embodiments of the invention relate to the field of resource management in mobile networks; and more specifically, to a process and system for redistributed applications within a mobile edge cloud and a central cloud in a mobile network.

BACKGROUND ART

Mobile cellular telecommunication networks, referred to herein as "mobile networks," are large networks encompassing a large number of computing devices to enable mobile devices that connect wirelessly to the mobile network to communicate with other computing devices including both other mobile devices and other types of computing devices. The mobile devices, e.g., user equipment (UE) such as mobile phones, tablets, laptops, and similar devices, may frequently travel and shift connection points with the mobile network in a manner that maintains continuous connections for the applications of the mobile devices. Typically, the mobile devices connect to the mobile network via radio access network (RAN) base stations, which provide connectivity to any number of mobile devices for a local area or 'cell.' Managing and configuring the mobile network including the cells of the mobile network is an administrative challenge as each cell can have different geographic and technological characteristics.

The UE can execute applications at the UE that distribute some of their functions into the mobile network. The applications can have varying sensitivity to latency. Some applications require very low latency connections while other applications are more latency tolerant. Traditionally these applications were hosted by centralized cloud services. However, executing the applications at the centralized cloud could introduce unacceptable levels of latency.

The multi-access edge cloud (MEC) is a concept that is being introduced by mobile network operators. The MEC is deployed very close to the UE to host the applications for the UE and thereby reduce the latency and improve Quality of Service for these applications. Instead of sending all the application requests to the central cloud, for some of the latency sensitive applications, the application requests are directed to the Mobile Edge Cloud. This can significantly reduce the latency for these applications.

SUMMARY

In one embodiment, a resource manager in a mobile communication network has a method to orchestrate execution of a first class of latency sensitive applications and a second class of latency sensitive applications where the second class of latency sensitive applications are less latency sensitive than the first class of latency sensitive applications. The method includes determining whether aggregated resource usage has exceeded or is predicted to exceed a threshold usage level for a first multi-access edge cloud (MEC), obtaining a list of the second class of latency sensitive applications executing at the first MEC, determining whether a second MEC in a cluster with the first MEC has resources to execute at least one application from the list of the second class of latency sensitive applications, and transferring a state of a selected application of the second class of latency sensitive applications to the second MEC.

In another embodiments, a machine-readable medium comprises computer program code which when executed by a computer carries out the method of the resource manager including determining whether aggregated resource usage has exceeded or is predicted to exceed a threshold usage level for a first multi-access edge cloud (MEC), obtaining a list of the second class of latency sensitive applications executing at the first MEC, determining whether a second MEC in a cluster with the first MEC has resources to execute at least one application from the list of the second class of latency sensitive applications, and transferring a state of a selected application of the second class of latency sensitive applications to the second MEC.

In a further embodiment, a system includes a non-transitory machine-readable medium having stored therein a resource manager, and a processor coupled to the non-transitory machine-readable storage medium. The processor executes the resource manager. The resource manager executes the methods of the resource manager including determining whether aggregated resource usage has exceeded or is predicted to exceed a threshold usage level for a first multi-access edge cloud (MEC), obtaining a list of the second class of latency sensitive applications executing at the first MEC, determining whether a second MEC in a cluster with the first MEC has resources to execute at least one application from the list of the second class of latency sensitive applications, and transferring a state of a selected application of the second class of latency sensitive applications to the second MEC.

In additional embodiments, a network device or a control plane device can execute a resource manager, including in some embodiments via network function virtualization and/or other virtualization including use of virtual machines. The resource manager in these embodiments performs a method including determining whether aggregated resource usage has exceeded or is predicted to exceed a threshold usage level for a first multi-access edge cloud (MEC), obtaining a list of the second class of latency sensitive applications executing at the first MEC, determining whether a second MEC in a cluster with the first MEC has resources to execute at least one application from the list of the second class of latency sensitive applications, and transferring a state of a selected application of the second class of latency sensitive applications to the second MEC.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
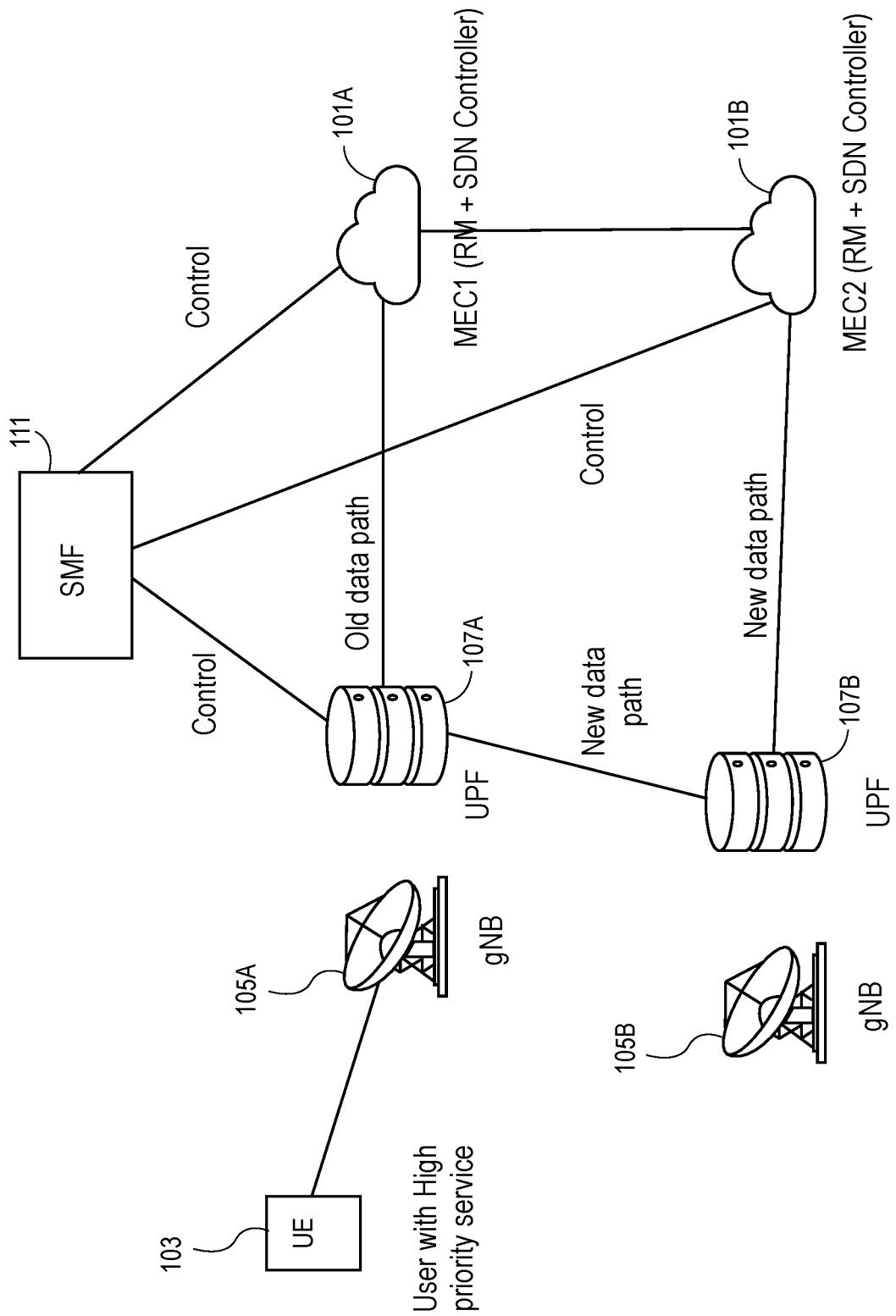
FIG. 1 is a diagram of one embodiment of a mobile network implementing resource managers and software defined networking (SDN) controller at the mobile edge cloud (MEC).

The following description describes methods and apparatus for managing resources in a multi-access edge cloud (MEC) of a mobile network. The process involves a resource manager and a software defined networking (SDN) controller. The resource manager monitors resource usage at a MEC to determine whether resource usage of the applications being executed therein exceed a threshold level or that additional applications have been assigned to the MEC such that predicted resource usage would exceed the threshold level. In response to the threshold being exceeded, the resource manager can coordinate with other MECs in the mobile network to redistribute some of the applications to other MECS. If other MECs do not have the resources to take on the execution of some of the applications, then the applications can be redistributed to a central cloud system. The resource manager can support multiple classifications of applications based on latency requirements with a first class of applications with the most stringent latency requirements having a first priority and a second class of application with less stringent latency requirements having a second priority with regard to allocation of resources at the MECs.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The multi-access edge cloud (MEC) as used herein refers to computing resources positioned in proximity to a base station in mobile network. The MEC enables the execution of applications and services in support of applications at user equipment (UE) connected to the mobile network via the base station. A mobile network can have any number of MECs that service at least one base station. An MEC can service multiple base stations in a local geographic area. Multiple MECs may serve the same base station. The MECs can be clustered (i.e., grouped) in a geographic region such that the MECs in a cluster can maintain relatively low latencies between the members of the cluster such that some applications and services that are hosted at one MEC in a cluster can be moved to another member of the cluster with small increases in latency and with less latency added than if the applications or services were moved to a centralized cloud. However, the MECs have fewer resources available to them than the centralized cloud. When the MEC connected to a base station where the UE is connected, is out of resources to host or support an application, then the application can be offloaded to another MEC or the centralized cloud. Without the embodiments described herein, applications and services can only be moved to another MEC when the UE is handed off to the other MEC, e.g., when the UE moves to that cell/region served by the other MEC.

The embodiments overcome problems of the prior art by providing a resource manager that works in combination with software defined networking (SDN) to forward requests from a first MEC (MEC1) to another MEC (MEC2) even when the user remains connected to a base station associated with the first MEC. This reduces the latency of communications between the UE and the applications and services that are utilized by the UE by moving the applications and services to the other MEC rather than to a centralized cloud. The embodiments thus reduce latency for using applications and services hosted in MECs and thereby improves user experience in latency sensitive applications.

Before MECs were introduced into mobile networks, all requests from the UEs for applications and services were forwarded to central cloud where the applications and services were hosted. But, latency sensitive applications will have delays if the requests are sent to the central cloud. The goal of introducing MECs into a mobile network is to serve latency sensitive applications and services at the MECs and latency in-sensitive and security critical applications at the central cloud. However, when there are resource constraints at the MECs, some of the applications and services need to be moved to a peer MEC (one of the neighboring MECs). The applications can be classified into any number of classes. In one example embodiment, three classes are utilized. The applications and services which are very latency sensitive can be the first class. In one example, the first class can be applications and services that correspond to the ultra-reliable low latency communication (URLLC), also called Class-A, of the 5G NR family of technologies as defined by the 3rd generation partnership project (3GPP). The applications and services in the first class will be prioritized to be served by the MEC corresponding to the base station the requesting UE is connected with, which is also referred to as the home MEC. The second class of applications that are latency sensitive but not as sensitive as Class-A (e.g., mobile Internet of things (mIOT) devices) can be served by one of the peer MECs if there are not enough resources in the home MEC. These applications and services in the second class can also be referred to as Class-B applications and services. The applications and services that are not latency sensitive and which have strict security requirements can default to be served by the central cloud and can be referred to as Class-C applications. In some cases, MECs can have just one host, one rack, a mini cloud, or similar hardware resources. The MECs can run out of resources because resources are not plentiful. In that case all the latency sensitive application requests cannot be handled by the MEC. The embodiments propose a way to serve latency sensitive requests at the MEC layer even when the home MEC cannot serve the requests. The embodiments use a cluster of MEC clouds. Each cluster of MECs has an SDN Controller and each MEC will have a resource manager to monitor the resources of the MEC.

A central cloud can be a data center or similar facility with a large amount of computing resources that can host any number, variety, or type of application or service. The compute resources at the central cloud are effectively unlimited or unrestricted. The compute resources at the central cloud can involve any number processors, hosts, storage devices, and related compute resources that are managed by orchestration managers and similar software to manage applications and services to ensure sharing and assignment of the application and services to compute resources. The central cloud can host applications and services provided by any number of entities separate from the entity that manages the central cloud.

FIG. 1 is a diagram of one embodiment of a mobile network implementing resource managers and software defined networking (SDN) controller at the mobile edge cloud (MEC). In this example, a first MEC 101A is directly connected to gNodeB(gNB)/Base Station 105A. The MEC-1 101A of gNB 105A is directly connected to MEC-2 101B of gNB 105B. The illustrated mobile network is a 5G NR as defined by the 3GPP. The principles, structures, and processes described herein are also applicable to other technologies such as 4G by 3GPP.

In this example, a UE 103 is connected to the gNB 105A. A user plane function (UPF 107A) at the gNB 105A can route traffic from the UE 103 to applications and services that the UE 103 requests at the MEC1 101A. In this example, MEC1 is out of resources and one or more of the applications or services that are running in MEC-1 have to be terminated or moved out. If there are applications or services belonging to the second class (i.e., Class-B) running at MEC1 101A then they can be moved to MEC2 101B. Any number or selection of the second class application and services can be selected such that the resource usage at MEC1 101A is reduced below a threshold to ensure the proper execution of the application and service in the first class. The applications and services can be containerized and be managed by an orchestrator or container manager at each MEC.

When an application or service being transferred from MEC1 101A to MEC2 101B that is not already running on MEC2 101B, the application or service will be copied to MEC2 101B from the central cloud or MEC1 101A. Then the application will be started on MEC2 101B and the current state of the application will be copied from MEC1 101A to the newly started instance on MEC2 101B. Once the state has been transferred, then all the requests for the transferred applications from gNB 105A will be redirected to MEC2 101B. The old (original data path) to MEC1 101A is shown along with the rerouted data path (new data path) in the diagram of FIG. 1.

The second class (i.e., Class-B) applications are transferred to a nearest MEC with available resources instead of the central cloud and thus the latency for application requests for the transferred applications and services does not increase substantially.

In the illustrated example, resource managers (RMs) that monitor each MEC execute at the respective MECs 101A,B. The RMs monitor resource usage and manage decisions of which applications and services are transferred including negotiating with other MECs to determine where the applications are serviced and the management of the transfer. RMs can also direct SDN controllers to redirect the flow of application requests from UEs 103 to the new location of the applications and services. The SDN controllers configure the flows of these application requests to the MEC where the applications and services are transferred. This includes configuring flow controllers using the control plane of the SDN to identify and reroute the application requests. The SDN controller operates in conjunction with the respective UPFs 107A,B and the session management function (SMF) 111 in a 5G network to affect the rerouting of the application requests and associated data traffic.

When second class applications and services are transferred, the SDN controller can set the packet forwarding rules in the respective UPFs 107A, B such that UPF 107A can forward application request packets received from gNB 105A to UPF 107B instead of MEC 101A. UPF 107B then forwards the received forwarded packets to MEC2 101B where the application and services have been relocated due to resource shortage at MEC1.

In some embodiments, multiple second class applications may be admitted and allotted into the associated MEC, referred to as overbooking, since the resource usage may not always be consistent. For example, IOT applications which are second class application and service candidates for offloading can be non-guaranteed bit rate (non GBR) services. Thus, they can be overbooked with low estimates of their expected resource utilization. Where a MEC has a number of such applications, there is a possibility of being in overload even though an initial estimation has been done. GBR applications and services can be a characteristic that distinguishes between first class and higher classes of applications.

In some embodiments, the SDN controller can be located at the SMF (so that it is trusted) and can have an Internet Protocol Security (IPSec) tunnel between the central cloud, RM, and SDN Controller. The embodiments can also define interfaces (proprietary or via standards) between these components. In other embodiments, a distributed SDN controller can be utilized. In this case, there can be an IPSec tunnel between SDN Controller located at MEC and the SMF.

Second class applications can include a wide range of latency sensitive applications. Home automation IOT applications like personal assistant type connected devices can be considered delay sensitive when user experience is impacted. For e.g., a security sensor or device that reports a glass break and may trigger a 911 call, an old person falls down and may have a connected device to trigger a 911 call, or if there is personal assistant application request to switch a light on/off can be several example use cases. Blocking such applications requests for lack of resources or sending the same request to the central cloud will lead to poor user experience. With more and more homes becoming connected these type of services will continue to increase. The embodiments are similarly applicable to industrial and commercial automation (CIoT). With thousands of connected devices like sensors the associated traffic will need offloading rather than termination or transfer to the remote cloud for computation and response. Gaming functions can benefit from offloading to a nearby MEC. At-least for single player games where the computer is the adversary or for AI based functions in multi-player games, there will be clear benefit from keeping computation close by.

Figure 2:
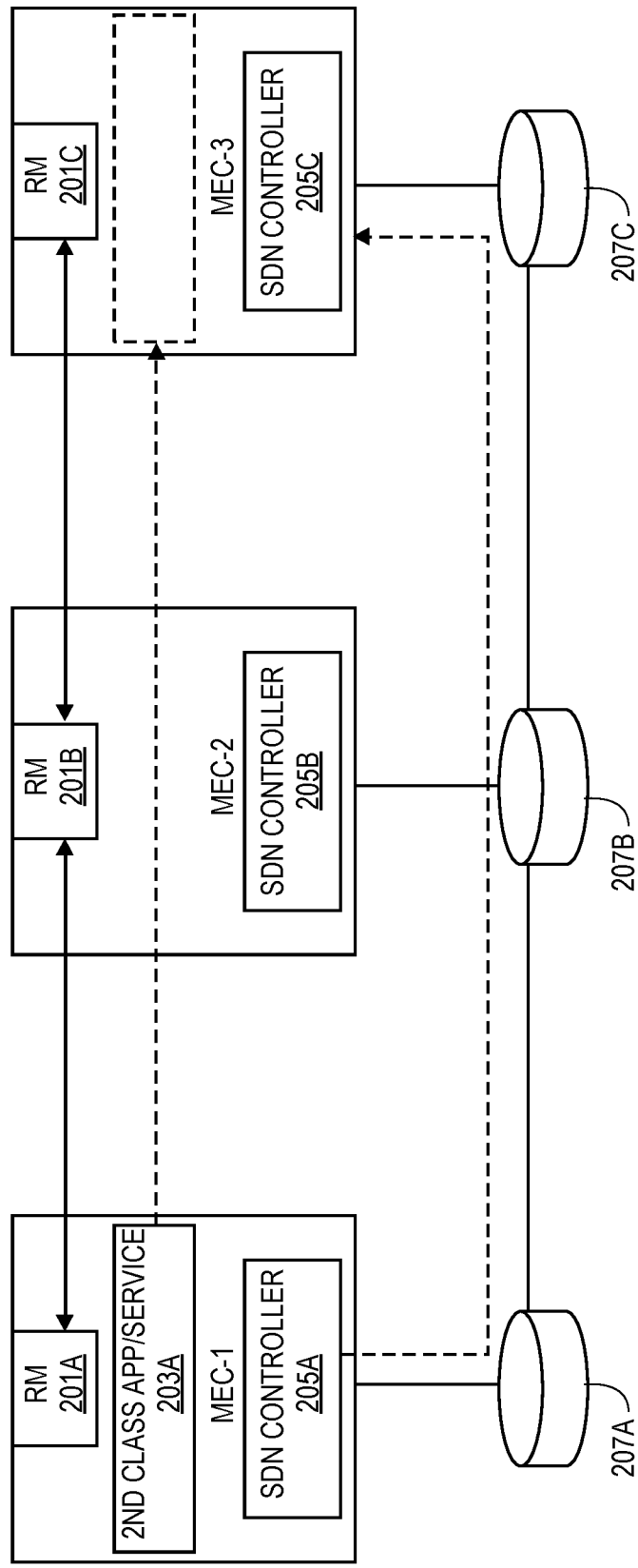
FIG. 2 is a diagram of one embodiment of resource manager communication between multi-access edge clouds (MECs) to transfer an application or service within a cluster of the MECs.

FIG. 2 is a diagram of one embodiment of resource manager communication between MECs. FIG. 2 shows a cluster of MECs. Each of the MECs has an SDN controller and also each MEC will has a local resource manager (RM). The local SDN controller is responsible for adding packet rules at respective MEC so that the received application requests are re-directed to the appropriate MEC when the requested applications or services have been transferred. The RM in each of the MECs monitors the resource usage. When the RM detects that the resources in a MEC are reaching a defined threshold, the RM will determine a list of second class (Class-B) applications that can be served by one of the other nearby MECs. The RM can directly poll compute resources, receive reports of resource usage from the resources or other monitoring software, or similarly collect compute resource usage. The threshold for compute resource usage can be administrator defined, mobile network operator defined, determined based on historical usage, determined based on prior failure, or using similar techniques. A list of applications and their classifications can be maintained by the RM or similar component. Each application as it is instantiated or allotted to the MEC can be analyzed to determine the classification of the application. In some embodiments, applications can include class identifying information that is extracted or accessed by the RM. In other embodiments, the mobile network operator or similar administrator classifies the hosted applications, and the RM performs a lookup on a table or similar data structure to determine the classification based on identifying information about the applications. In further embodiments, the RM can utilize an analysis of the operation of the applications to determine the classification based on the frequency of application requests, protocol types utilized for the application requests, responsiveness of the responses to the application requests, and similar criteria.

Where the threshold has been exceeded, the RM communicates with a set of other RMs in the cluster to decide the placement of the second class (Class-B) applications. If there are no resources available even in other MECs within the cluster, then such the second class (Class-B) application requests will be served by the central cloud by moving the applications and services to the central cloud. Depending on where the applications and services are to be repositioned, the RM coordinates with the central cloud to move the applications and services. The RM contacts the responsible SDN controller to manage the redirection of the associated application requests. The SDN controller will add packet rules to SDN switches and similar flow control tables at the original base station and along the route of the redirection so that such application requests for the second class applications and services are sent to the core network which will then forward it to the central cloud.

If there are resources available in other MECs in the cluster, then the RM transfers the applications and services to a selected MEC in the cluster. The application and services selected for transfer have to be started in the selected MEC and the application and services state has to be copied to the new MEC's applications and services. The RM instructs the appropriate SDN controller to add corresponding flow rules to redirect application requests to the selected MEC. The SDN controller will then add packet rules to forward request from original MEC such that the transferred second class applications are forwarded to the newly selected MEC.

In the illustrated example of FIG. 2, the RM 201A of MEC1 can detect that MEC1 has exceeded a resource usage threshold or is predicted to exceed the threshold in a defined timeframe. The RM 201A can identify the set of second class applications and services that are hosted by the MEC1. The RM 201A can then select a subset of the set of second class applications to be moved to another location. Any process can be used to select the subset of the set of second class applications. In some embodiments, the RM 201A can select a minimum number of second class applications and services to reduce the resource usage below the threshold or below a defined margin below the threshold. In other embodiments, the RM 201A can select the subset of the second class applications and services based on a ranking or similar prioritization of the second class applications based on latency sensitivity with the least latency sensitive applications selected with sufficient resource usage to reduce the usage at MEC1 below the threshold. Any combination or permutation of these techniques can be utilized to select the subset of applications and services to be relocated.

The RM 201A then begins a negotiation with the other RMs in the cluster (e.g., RM 201B and 201C) to determine whether the other MECs can receive the selected subset of applications and services to be relocated or any portion thereof. Any protocol can be utilized for the RMs to communicate that is via broadcast, point to point, or similar protocol mechanisms. In some embodiments, the RM can continuously or periodically exchange state information on the use of compute resources at the respective MECs to enable the other RMs to make decisions about relocating resources unilaterally. Similarly, each RM can implement a separate decision making process for deciding how many applications and services can be received. In some example embodiments, each RM determines whether the local MEC has compute resources that can be utilized while remaining below a local threshold usage level. In other example embodiments, each RM determines a compute resource availability that is advertised to the other RMs. Where multiple RMs have available space, the RM seeking to transfer applications and service can select from among the available RMs based on latency between the UE and the MEC with compute resources. In some cases, applications and services that have been transferred to the RM seeking to offload applications and services can be prioritized to be returned to the original MEC or offloaded to the central cloud.

In the illustrated example, the RM 201A selects a subset of second class applications and services 203A to be transferred to the MEC3. The RM 201A requests that the local RM 201C instantiate these applications and services at MEC3. Once the applications and services have been instantiated at the target MEC3, then the state of the applications and services to be transferred are sent to the RM 201C, which can then provide the state to the respective applications and services at MEC3. Once the state has been transferred, the applications and services at the MEC3 are ready to service the UE application requests. The RM 201A requests that the SDN controller 205A reroute the application requests to the new location of the application services at MEC3. The SDN controller 205A can reroute the application requests from the MEC1 to MEC by configuring intermediate SDN switches 207A-C via SDN control messages to configures flow control rules at each SDN switch to recognize and forward the application requests for the transferred applications and services to MEC3.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 3:
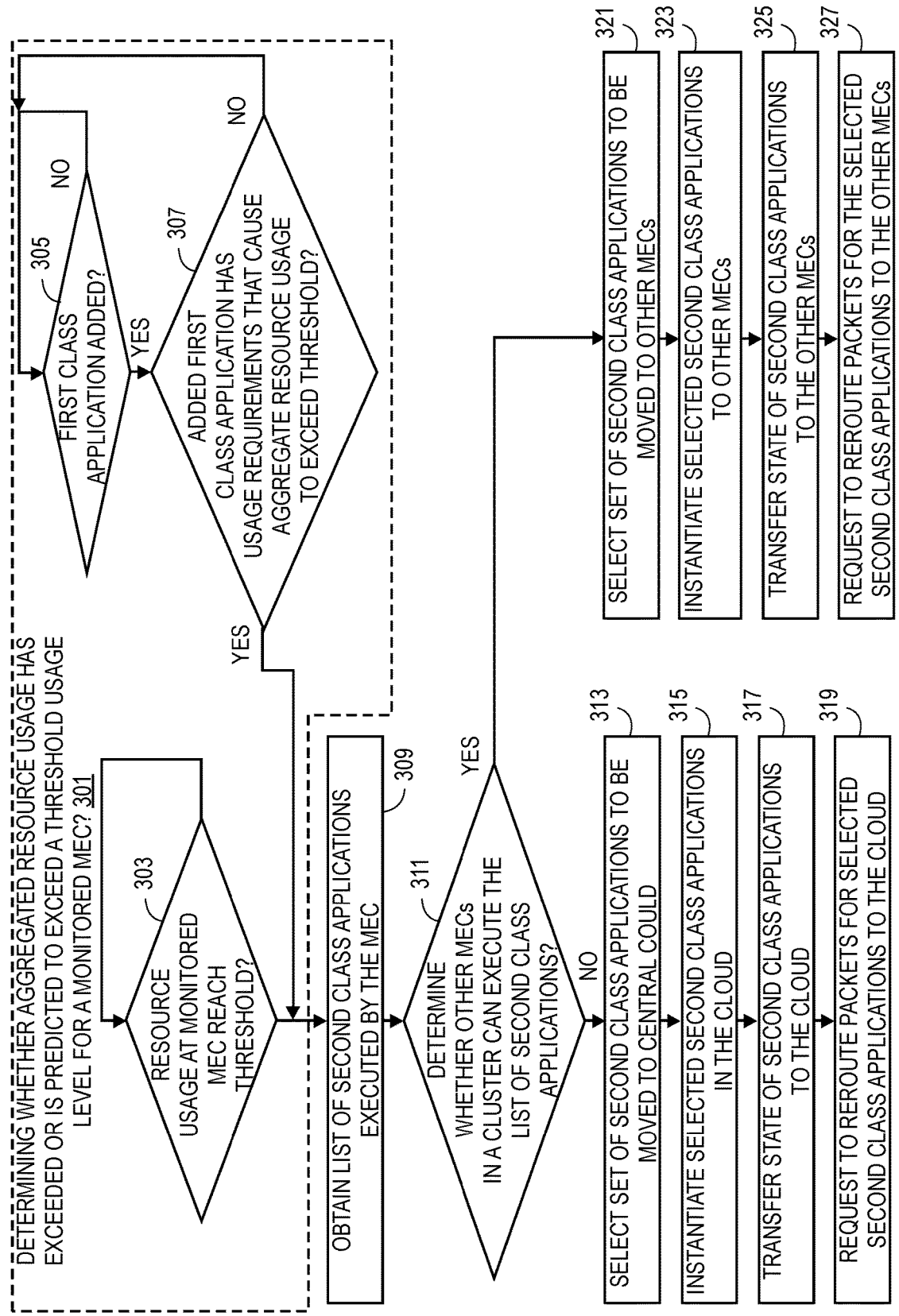
FIG. 3 is a flowchart of one embodiment of a process for resource managers.

FIG. 3 is a flowchart of one embodiment of a process for an RM to determine how to manage resources for an associated MEC. In one embodiment, the process is triggered where the aggregated resource usage has exceeded or is predicted to exceed a threshold level for the MEC that is monitored by the executing RM (Block 301). The aggregated resource usage can be an accumulation of all of the applications and services hosted by the monitored MEC. The resource can be monitored by polling of or reporting by the orchestrators, hypervisors, or operating systems or the MEC.

The aggregated resource usage can be checked at any interval or frequency. Any combination of resources can be monitored including processor usage, memory usage, storage, bandwidth usage, or similar resource monitoring. Similarly, any metric or combination of metrics can be utilized to monitor the MEC. The threshold level can be administrator or operator defined. In other embodiments, artificial intelligence and/or resource monitoring feedback can automate the detection of optimal resource utilization levels at the MEC using historical data, transferred learning, or similar techniques.

The monitoring of aggregated resource usage can encompass any number of particular triggers that can cause the RM to offload second class applications. In one example embodiment, the addition of a first class application to the MEC can trigger an analysis of the aggregated resource usage (Block 305). When a UE or similar entity requests an application or service that is hosted at the MEC monitored by the RM where the requested application or service is in the first class of applications, then the RM checks whether first class application or service to be added at the MEC has usage requirements that cause the aggregate resource usage to exceed the threshold (Block 307). Each application, including first class applications, can have an allotment of compute resources that are reserved at the time they are initiated. In some cases, these allotments will not be completely utilized. The monitoring of aggregated resources can be a monitoring of allotted resources and/or average actual aggregated resource usage. In some cases, the aggregated resource usage can also be monitored for spikes or time periods of increased resource usage that may exceed the threshold even when the average resource usage remains below the threshold such that redistribution of the applications and services can avoid such spikes that may reduce UE user experience quality. If the added first class application does not cause the aggregated resource usage to exceed the threshold, then the process continues to monitor for additional changes to the aggregated resource usage.

The addition of second or higher class applications and services does not trigger this analysis since these are handled in a different fashion. Second class applications and services are added to the MEC where the resource usage remains below the threshold. However, if the addition of the second class applications or services would increase the resource usage above the threshold, then the second class applications can be sent to the central cloud or offloaded to another MEC. Higher class applications and services can be directly off-loaded to the central cloud in many embodiments.

Another trigger case can be the actual or allotted aggregate resource usage at the monitored MEC exceeding the threshold based on polling or reporting (Block 303). Where any case of aggregated resource usage exceeding the threshold is detected, the RM can collect a list of second class applications currently hosted by the monitored MEC (Block 309). The list of second class applications can be maintained by the RM or obtained from the orchestration, hypervisors, operating systems, or similar entities of the MEC. Upon obtaining the list of second class applications, a check can be made to determine whether other MECs in the cluster can execute any subset of the second class applications that would lower the aggregate resource usage of the monitored MEC below the threshold (Block 311). The RM can communicate with the other RMs in the cluster using any protocol and select another MEC with the lowest latency and sufficient compute resources to host a subset of the second class applications.

Where at least one MEC capable of taking on a subset of the second class applications is found, then the process of the RM selects the specific second class applications to move to the other MEC (Block 321). In some cases, the RM can select second class applications that are already present at other MECs in the cluster such that they can service the UEs of the local MEC with less added compute resource usage than other MECs in the cluster. The selected subset of the second class applications is sufficient to reduce the load below the threshold. Once selected, the subset of selected second class applications can be instantiated, if needed, at the target MEC (Block 323). In some embodiments, multiple other MECs in a cluster can have compute resource availability and the set of applications to be transferred can be divided amongst the available MECs based on latency, existing instances running on the target MECs, amount of available compute resources, and similar factors.

Once the target MECs have the instances of the applications and services running, then the state of the applications and services to be transferred from the local MEC can be sent to the target MECs (Block 325). The RM can then direct the SDN controller to reroute application requests from UEs to the target MECs by establishing flow control rules at SDN switches along the route to the target MEC (Block 327).

Where none of the MECs in the cluster are capable of taking on a subset of the second class applications such that the aggregate compute resource usage can be lowered below the threshold, then the process of the RM selects the specific second class applications to move to the central cloud (Block 313). In some cases, the RM can select second lass applications that are already present at the central cloud such that they can service the UEs of the local MEC with less added compute resource usage than the transfer of other second class applications. The selected subset of the second class applications is sufficient to reduce the load below the threshold. Once selected, the subset of selected second class applications can be instantiated, if needed, at the central cloud (Block 315). The selection of second class applications that are sent to the central cloud can be based on latency sensitivity, compute resource usage, and similar characteristics of the second class applications. Once the central cloud has the instances of the applications and services running, then the state of the applications and services to be transferred from the local MEC can be sent to the central cloud (Block 317). The RM can then direct the SDN controller to reroute application requests from UEs to the central cloud by establishing flow control rules at SDN switches along the route to the central cloud (Block 319).

Figure 4:
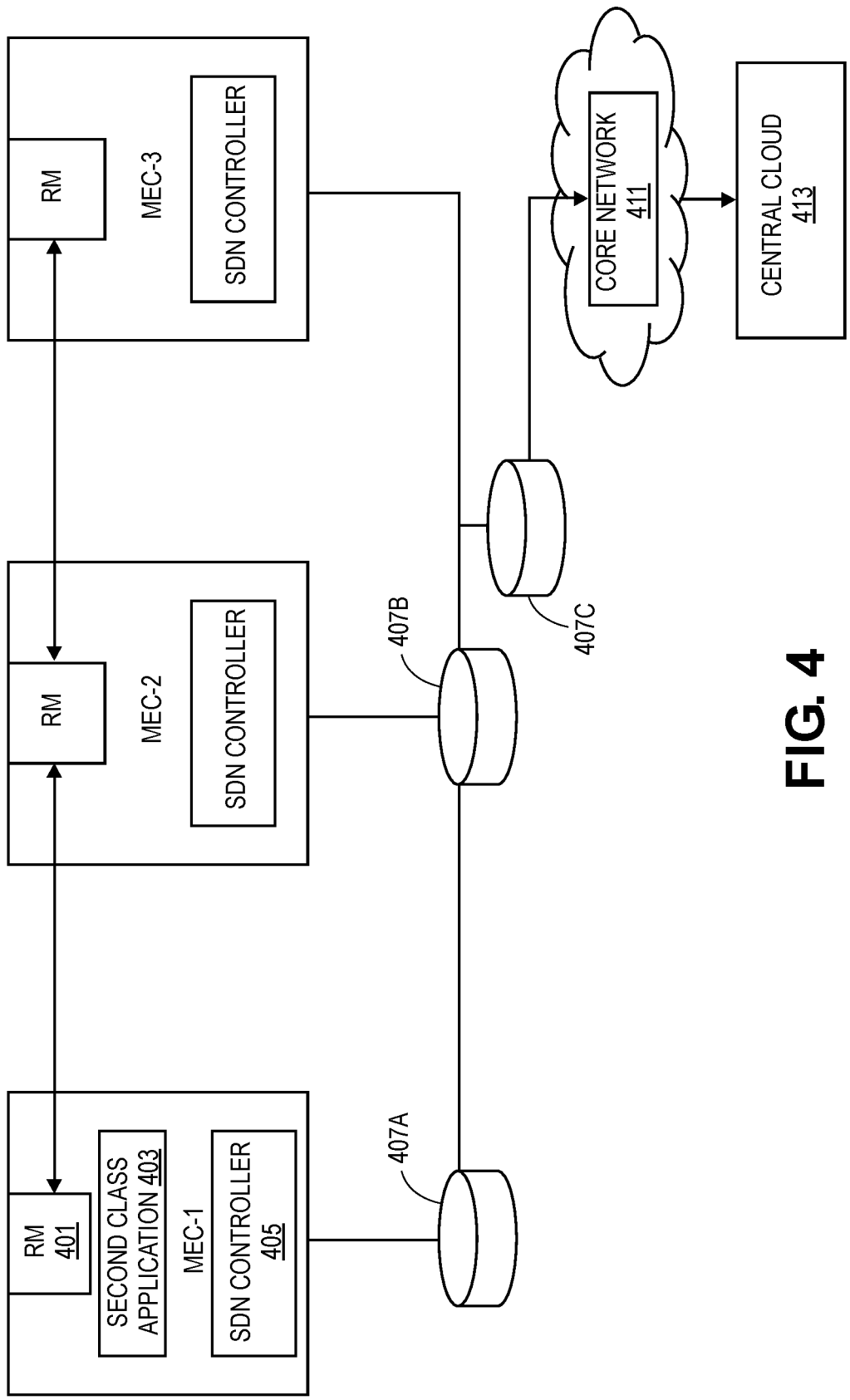
FIG. 4 is a diagram of one embodiment of resource manager communication to transfer an application to a central cloud.

FIG. 4 is a diagram of one embodiment of a network where a second class application is transferred to the central cloud. This case illustrates a scenario when there are no resources in the cluster and the RM 401 in MEC1 transfers the second class applications and services 403 to the central cloud 413 and instructs its SDN controller 405 to forward the application packets to central cloud 413. The SDN controller 405 then programs the routers/switches 407A-C along the route to forward the application request packets to the central cloud 413 via a core network 411 (e.g., via a SW-Gateway).

Figure 5:
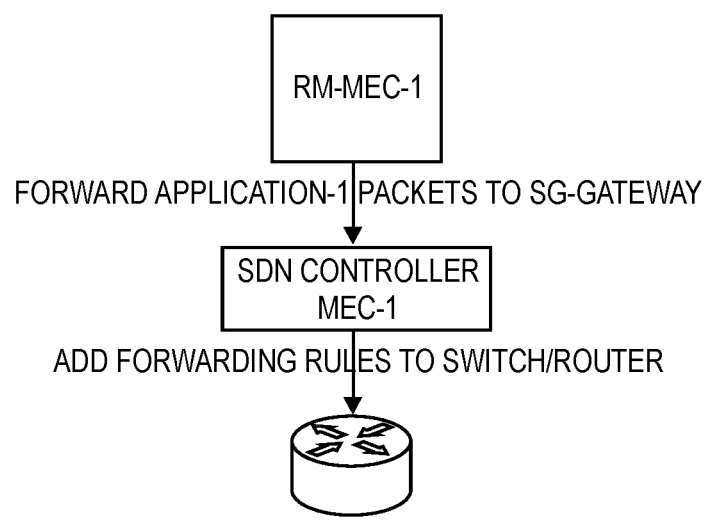
FIG. 5 is a diagram of one embodiment of packet forwarding managed by the resource managers.

FIG. 5 is a diagram of one embodiment of the communication between the RM and SDN controller to reroute application requests. The RM sends a request to the SDN controller to reroute applications requests for a set of identified second class applications. Where the second class applications have been transferred to the central cloud, the request to reroute can send the application requests to be sent to the SW-gateway of the mobile network. The SDN controller can then configure the routers/switches in the core network to enable the forwarding of the application requests to the applications and services that will service the application requests in the central cloud.

Figure 6:
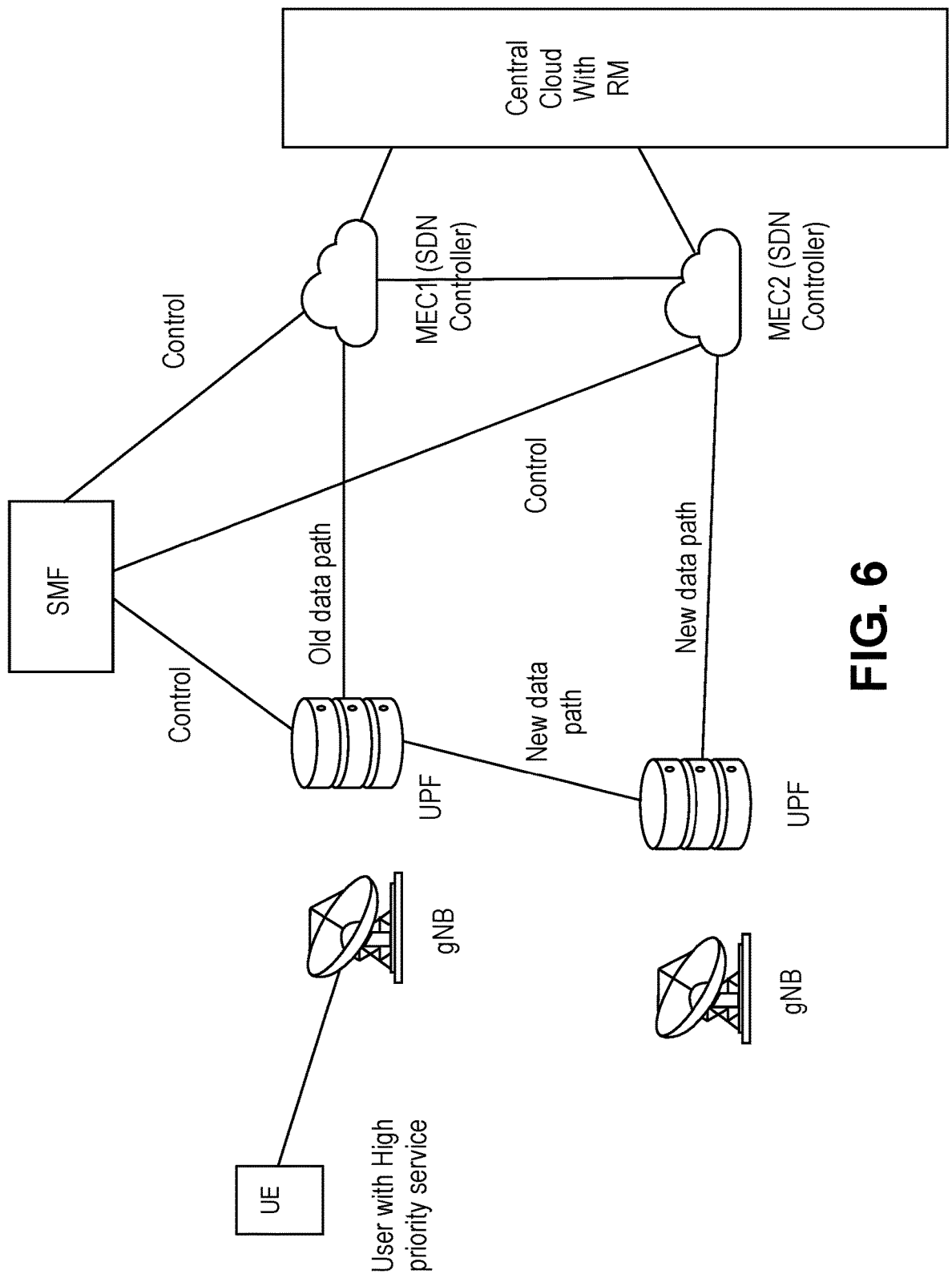
FIG. 6 is a diagram of one embodiment of a mobile network implementing resource managers at a central cloud and SDN controllers at the MECs.

FIG. 6 is a diagram of an alternate configuration of the mobile network that supports the embodiments. In this architecture, the gNB is servicing a UE with a high priority (i.e., latency sensitive) application. The applications and services in MEC1 have been transferred to MEC2 such that a new data path from the gNB (and UPF) are established to MEC2. In this example architecture, a centralized RM operates at the central cloud and monitors the MEC1. Other MECs can similarly have an instance of the RM executing in the central cloud or in some embodiments locally.

Figure 7:
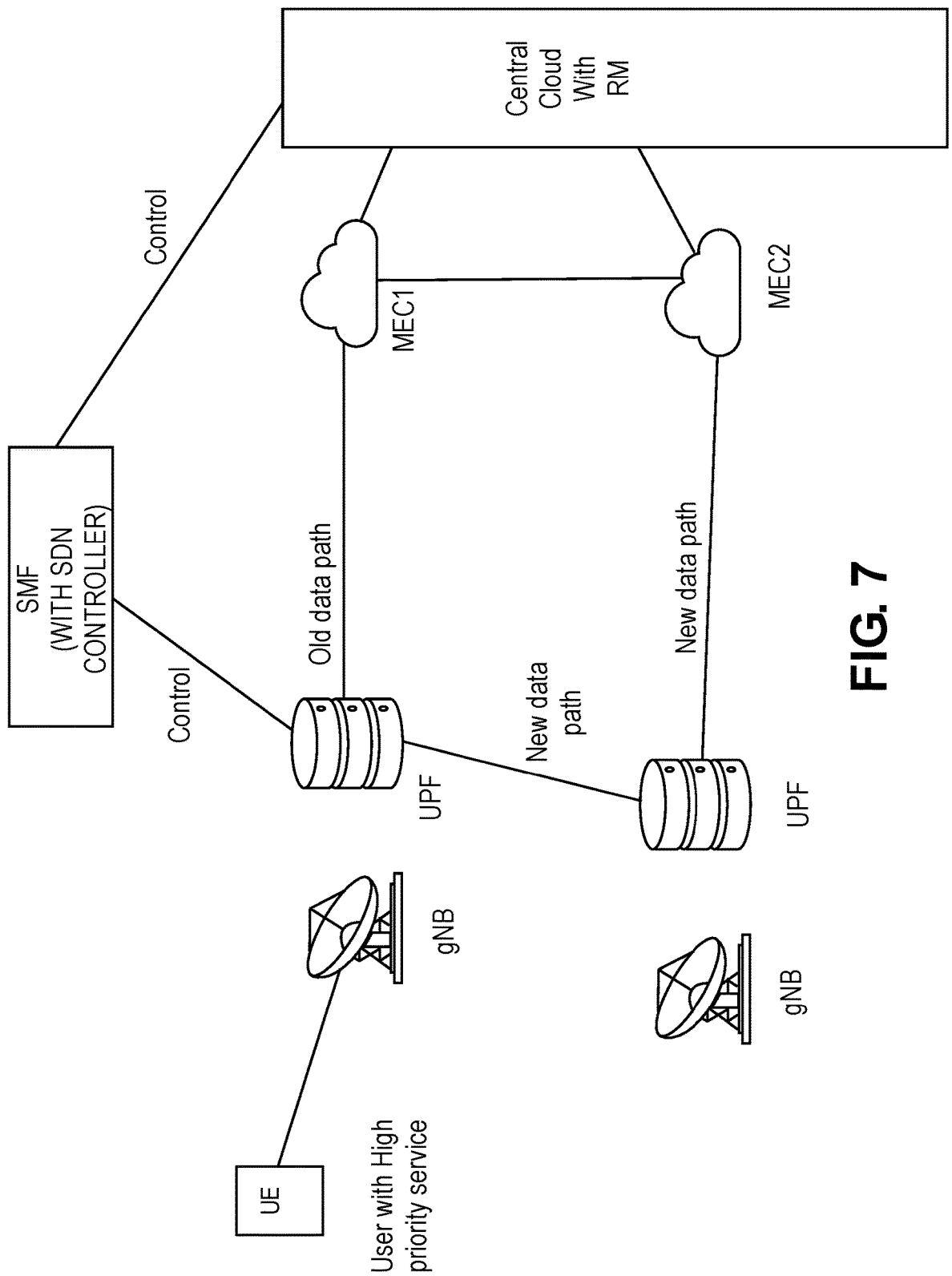
FIG. 7 is a diagram of one embodiment of a mobile network implementing resource managers at the central cloud and an SDN controller at the session management function (SMF).

FIG. 7 is a diagram of an alternate configuration of the mobile network that supports the embodiments. In this architecture, the gNB is servicing a UE with a high priority (i.e., latency sensitive) application. The applications and services in MEC1 have been transferred to MEC2 such that a new data path from the gNB (and UPF) are established to MEC2. In this example architecture, a centralized RM operates at the central cloud and monitors the MEC1. Other MECs can similarly have an instance of the RM executing in the central cloud or in some embodiments locally. The SDN controller in this architecture is also centralized at the SMF and can serve each of the RMs/MECs to manage the rerouting of application requests.

Figure 8:
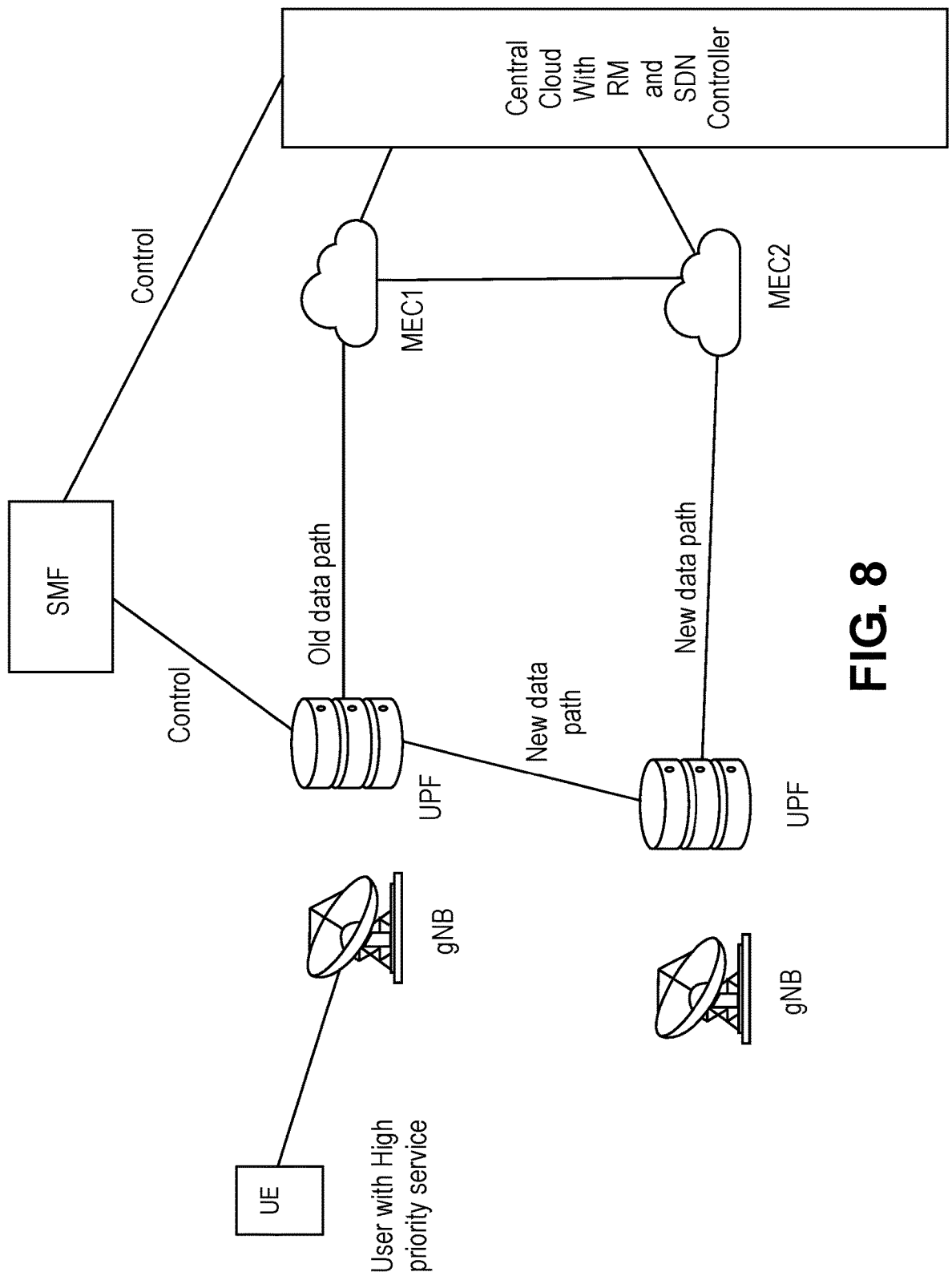
FIG. 8 is a diagram of one embodiment of a mobile network implementing resource managers and SDN controller at the central cloud.

FIG. 8 is a diagram of an alternate configuration of the mobile network that supports the embodiments. In this architecture, the gNB is servicing a UE with a high priority (i.e., latency sensitive) application. The applications and services in MEC1 have been transferred to MEC2 such that a new data path from the gNB (and UPF) are established to MEC2. In this example architecture, a centralized RM operates at the central cloud and monitors the MEC1. Other MECs can similarly have an instance of the RM executing in the central cloud or in some embodiments locally. The SDN controller in this architecture is also centralized at the central cloud and can serve each of the RMs/MECs to manage the rerouting of application requests.

Figure 9:
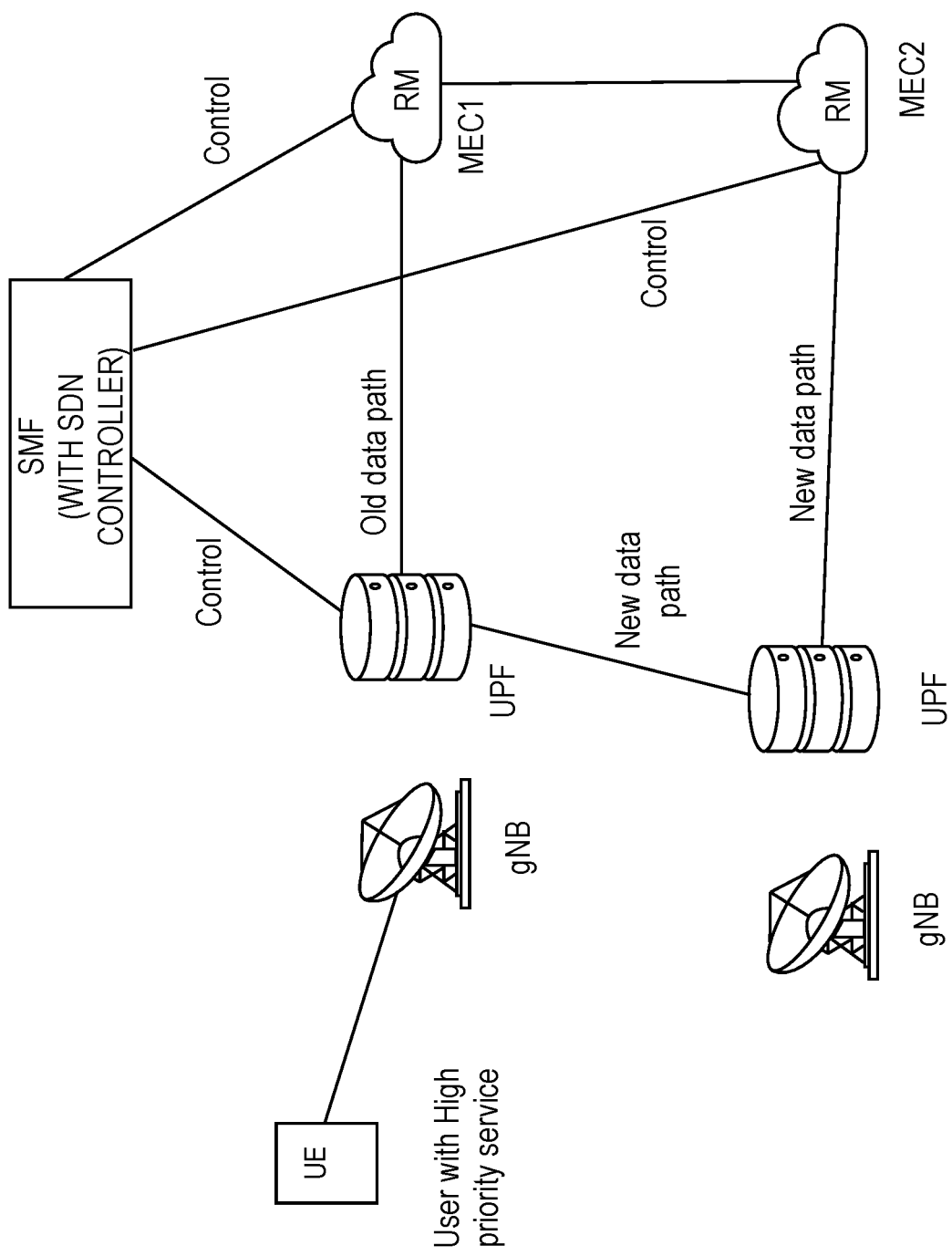
FIG. 9 is a diagram of one embodiment of a mobile network implementing resource managers at the MECs and the SDN controller at the SMF.

FIG. 9 is a diagram of an alternate configuration of the mobile network that supports the embodiments. In this architecture, the gNB is servicing a UE with a high priority (i.e., latency sensitive) application. The applications and services in MEC1 have been transferred to MEC2 such that a new data path from the gNB (and UPF) are established to MEC2. In this example architecture, each RM operates at the respective MEC. The SDN controller in this architecture is also centralized at the SMF and can serve each of the RMs/MECs to manage the rerouting of application requests.

The embodiments can benefit many types of applications and services including applications and services related to home automation, industrial automation, Internet of Things applications, and similar types of applications and services. The embodiments can also benefit gaming applications and services where these applications have autonomous functions such as artificial intelligence controlling non-player characters and opponents (e.g., an AI chess opponent).

The embodiments have advantages over the prior art, including that the RMs can choosing certain delay tolerant (i.e., latency sensitive) application and services for offloading since not all applications may be relocated from one MEC to another, and offloading of the applications and services from one MEC to another with help of a RM at the MEC or central cloud can keep track of the state of the compute and storage resources at the various MECs connected to different gNBs. Further advantages of the embodiments include the MECs being used for offloading may not be connected to the same gNB and the use of a communication mechanism between the participating MECs (e.g., via the RMs) and not necessarily between the participating gNBs, where an application or service A (belonging to the second class) is not already running on another target MEC for a transfer, an instance of the application or service can be copied to the target MEC from the central Cloud. When the application or service is started on a target MEC, then the current state of the application or service is copied from an originating MEC before the data forwarding is started by way of programming switch or UPF (via SDN Controller). By setting up a service priority level, it is also possible to perform a similar offload of a certain already running application of the second class to a connected target MEC if an application of first class requests service from the originating MEC.

Figure 10A:
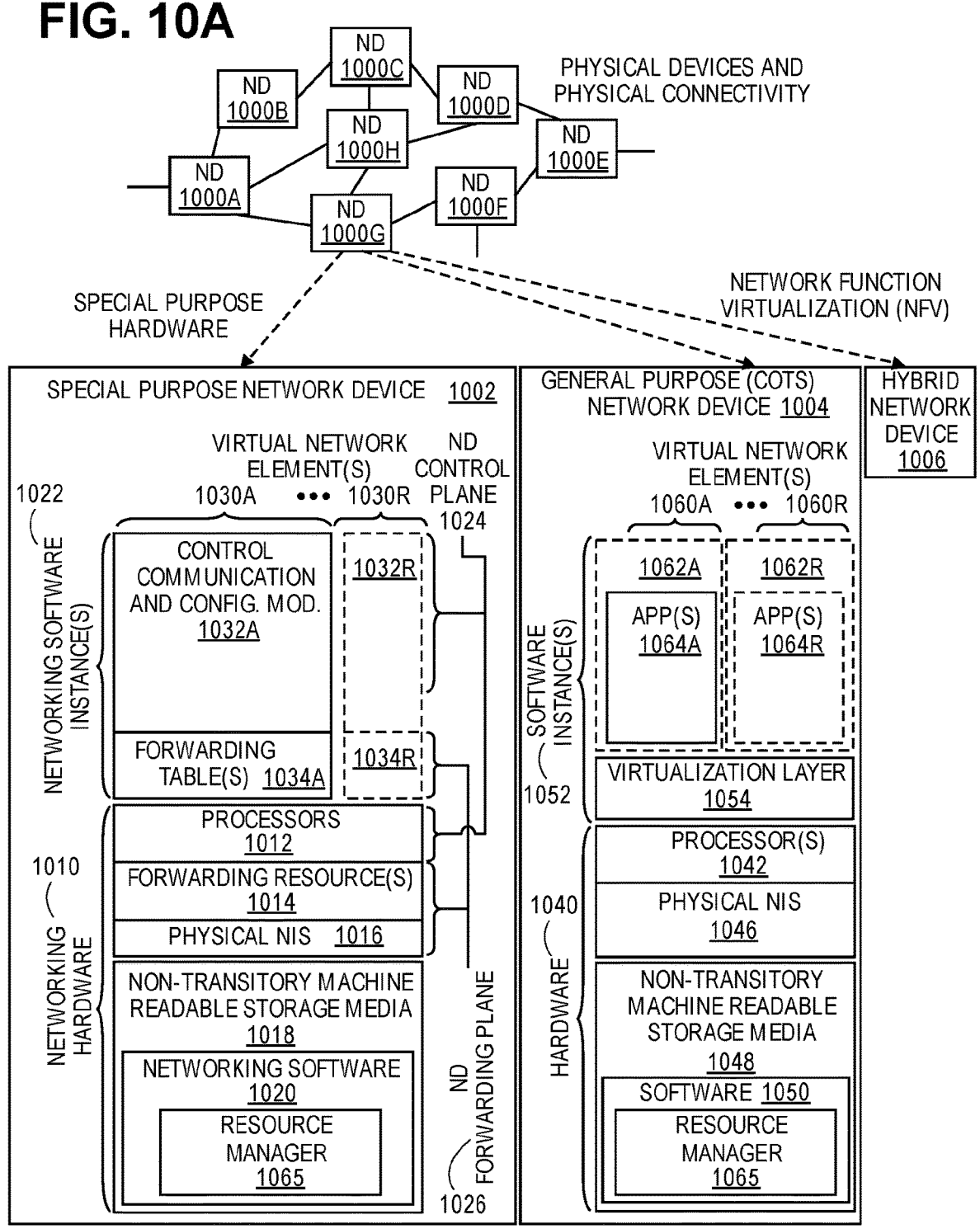
FIG. 10A illustrates connectivity between network devices (NDs) within an exemplary network, as well as three exemplary implementations of the NDs, according to some embodiments of the invention.

FIG. 10A illustrates connectivity between network devices (NDs) within an exemplary network, as well as three exemplary implementations of the NDs, according to some embodiments of the invention. FIG. 10A shows NDs 1000A-H, and their connectivity by way of lines between 1000A-1000B, 1000B-1000C, 1000C-1000D, 1000D-1000E, 1000E-1000F, 1000F-1000G, and 1000A-1000G, as well as between 1000H and each of 1000A, 1000C, 1000D, and 1000G. These NDs are physical devices, and the connectivity between these NDs can be wireless or wired (often referred to as a link). An additional line extending from NDs 1000A, 1000E, and 1000F illustrates that these NDs act as ingress and egress points for the network (and thus, these NDs are sometimes referred to as edge NDs; while the other NDs may be called core NDs).

Two of the exemplary ND implementations in FIG. 10A are: 1) a special-purpose network device 1002 that uses custom application-specific integrated-circuits (ASICs) and a special-purpose operating system (OS); and 2) a general purpose network device 1004 that uses common off-the-shelf (COTS) processors and a standard OS.

The special-purpose network device 1002 includes networking hardware 1010 comprising a set of one or more processor(s) 1012, forwarding resource(s) 1014 (which typically include one or more ASICs and/or network processors), and physical network interfaces (NIs) 1016 (through which network connections are made, such as those shown by the connectivity between NDs 1000A-H), as well as non-transitory machine readable storage media 1018 having stored therein networking software 1020. During operation, the networking software 1020 may be executed by the networking hardware 1010 to instantiate a set of one or more networking software instance(s) 1022. Each of the networking software instance(s) 1022, and that part of the networking hardware 1010 that executes that network software instance (be it hardware dedicated to that networking software instance and/or time slices of hardware temporally shared by that networking software instance with others of the networking software instance(s) 1022), form a separate virtual network element 1030A-R. Each of the virtual network element(s) (VNEs) 1030A-R includes a control communication and configuration module 1032A-R (sometimes referred to as a local control module or control communication module) and forwarding table(s) 1034A-R, such that a given virtual network element (e.g., 1030A) includes the control communication and configuration module (e.g., 1032A), a set of one or more forwarding table(s) (e.g., 1034A), and that portion of the networking hardware 1010 that executes the virtual network element (e.g., 1030A).

In some embodiments, the networking software 1020 can include the resource manager 1065 as described herein, which is executed by the processors 1012. In some embodiments the SDN controller and similar can be similarly stored and executed.

The special-purpose network device 1002 is often physically and/or logically considered to include: 1) a ND control plane 1024 (sometimes referred to as a control plane) comprising the processor(s) 1012 that execute the control communication and configuration module(s) 1032A-R; and 2) a ND forwarding plane 1026 (sometimes referred to as a forwarding plane, a data plane, or a media plane) comprising the forwarding resource(s) 1014 that utilize the forwarding table(s) 1034A-R and the physical NIs 1016. By way of example, where the ND is a router (or is implementing routing functionality), the ND control plane 1024 (the processor(s) 1012 executing the control communication and configuration module(s) 1032A-R) is typically responsible for participating in controlling how data (e.g., packets) is to be routed (e.g., the next hop for the data and the outgoing physical NI for that data) and storing that routing information in the forwarding table(s) 1034A-R, and the ND forwarding plane 1026 is responsible for receiving that data on the physical NIs 1016 and forwarding that data out the appropriate ones of the physical NIs 1016 based on the forwarding table(s) 1034A-R.

Figure 10B:
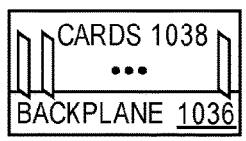
FIG. 10B illustrates an exemplary way to implement a special-purpose network device according to some embodiments of the invention.

FIG. 10B illustrates an exemplary way to implement the special-purpose network device 1002 according to some embodiments of the invention. FIG. 10B shows a special-purpose network device including cards 1038 (typically hot pluggable). While in some embodiments the cards 1038 are of two types (one or more that operate as the ND forwarding plane 1026 (sometimes called line cards), and one or more that operate to implement the ND control plane 1024 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1036 (e.g., a first full mesh coupling the line cards and a second full mesh coupling all of the cards).

Returning to FIG. 10A, the general purpose network device 1004 includes hardware 1040 comprising a set of one or more processor(s) 1042 (which are often COTS processors) and physical NIs 1046, as well as non-transitory machine readable storage media 1048 having stored therein software 1050. During operation, the processor(s) 1042 execute the software 1050 to instantiate one or more sets of one or more applications 1064A-R. While one embodiment does not implement virtualization, alternative embodiments may use different forms of virtualization. For example, in one such alternative embodiment the virtualization layer 1054 represents the kernel of an operating system (or a shim executing on a base operating system) that allows for the creation of multiple instances 1062A-R called software containers that may each be used to execute one (or more) of the sets of applications 1064A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1054 represents a hypervisor (sometimes referred to as a virtual machine monitor (VMM)) or a hypervisor executing on top of a host operating system, and each of the sets of applications 1064A-R is run on top of a guest operating system within an instance 1062A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1040, directly on a hypervisor (in which case the unikernel is sometimes described as running within a LibOS virtual machine), or in a software container, embodiments can be implemented fully with unikernels running directly on a hypervisor represented by virtualization layer 1054, unikernels running within software containers represented by instances 1062A-R, or as a combination of unikernels and the above-described techniques (e.g., unikernels and virtual machines both run directly on a hypervisor, unikernels and sets of applications that are run in different software containers).

In some embodiments, the software 1050 can include the resource manager 1065 as described herein, which is executed by the processors 1012. In some embodiments the SDN controller and similar can be similarly stored and executed.

The instantiation of the one or more sets of one or more applications 1064A-R, as well as virtualization if implemented, are collectively referred to as software instance(s) 1052. Each set of applications 1064A-R, corresponding virtualization construct (e.g., instance 1062A-R) if implemented, and that part of the hardware 1040 that executes them (be it hardware dedicated to that execution and/or time slices of hardware temporally shared), forms a separate virtual network element(s) 1060A-R.

The virtual network element(s) 1060A-R perform similar functionality to the virtual network element(s) 1030A-R—e.g., similar to the control communication and configuration module(s) 1032A and forwarding table(s) 1034A (this virtualization of the hardware 1040 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 1062A-R corresponding to one VNE 1060A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1062A-R to VNEs also apply to embodiments where such a finer level of granularity and/or unikernels are used.

In certain embodiments, the virtualization layer 1054 includes a virtual switch that provides similar forwarding services as a physical Ethernet switch. Specifically, this virtual switch forwards traffic between instances 1062A-R and the physical NI(s) 1046, as well as optionally between the instances 1062A-R; in addition, this virtual switch may enforce network isolation between the VNEs 1060A-R that by policy are not permitted to communicate with each other (e.g., by honoring virtual local area networks (VLANs)).

The third exemplary ND implementation in FIG. 10A is a hybrid network device 1006, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1002) could provide for para-virtualization to the networking hardware present in the hybrid network device 1006.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also, in all of the above exemplary implementations, each of the VNEs (e.g., VNE(s) 1030A-R, VNEs 1060A-R, and those in the hybrid network device 1006) receives data on the physical NIs (e.g., 1016, 1046) and forwards that data out the appropriate ones of the physical NIs (e.g., 1016, 1046). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 10C:
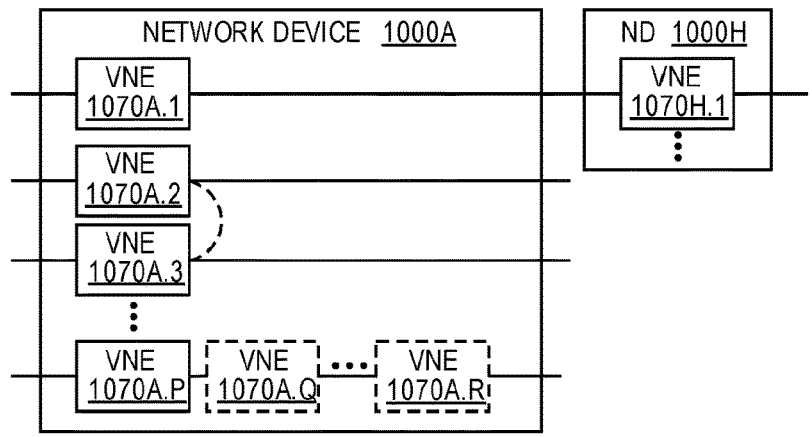
FIG. 10C illustrates various exemplary ways in which virtual network elements (VNEs) may be coupled according to some embodiments of the invention.

FIG. 10C illustrates various exemplary ways in which VNEs may be coupled according to some embodiments of the invention. FIG. 10C shows VNEs 1070A.1-1070A.P (and optionally VNEs 1070A.Q-1070A.R) implemented in ND 1000A and VNE 1070H.1 in ND 1000H. In FIG. 10C, VNEs 1070A.1-P are separate from each other in the sense that they can receive packets from outside ND 1000A and forward packets outside of ND 1000A; VNE 1070A.1 is coupled with VNE 1070H.1, and thus they communicate packets between their respective NDs; VNE 1070A.2-1070A.3 may optionally forward packets between themselves without forwarding them outside of the ND 1000A; and VNE 1070A.P may optionally be the first in a chain of VNEs that includes VNE 1070A.Q followed by VNE 1070A.R (this is sometimes referred to as dynamic service chaining, where each of the VNEs in the series of VNEs provides a different service—e.g., one or more layer 4-7 network services). While FIG. 10C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 10A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 10A may also host one or more such servers (e.g., in the case of the general purpose network device 1004, one or more of the software instances 1062A-R may operate as servers; the same would be true for the hybrid network device 1006; in the case of the special-purpose network device 1002, one or more such servers could also be run on a virtualization layer executed by the processor(s) 1012); in which case the servers are said to be co-located with the VNEs of that ND.

A virtual network is a logical abstraction of a physical network (such as that in FIG. 10A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 10D:
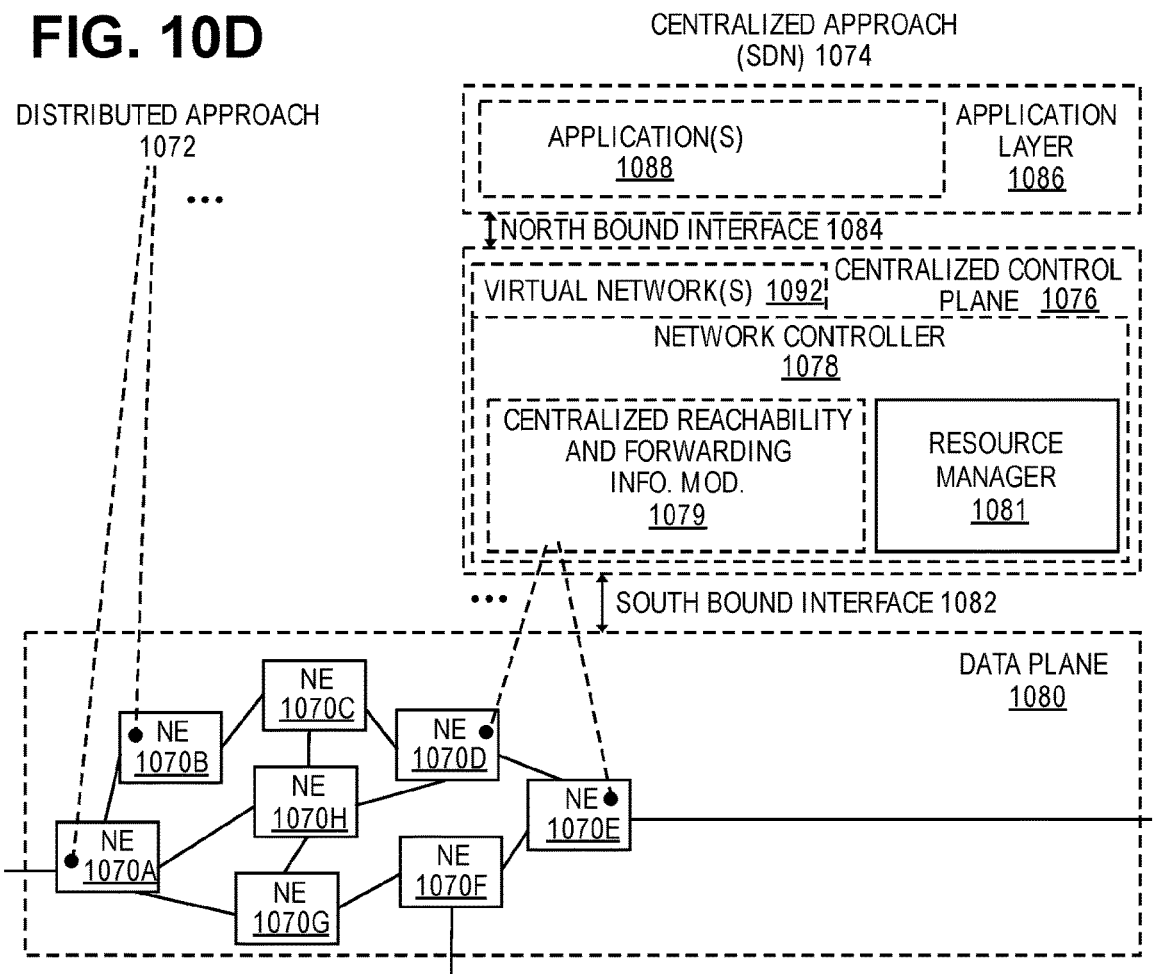
FIG. 10D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 10D illustrates a network with a single network element on each of the NDs of FIG. 10A, and within this straight forward approach contrasts a traditional distributed approach (commonly used by traditional routers) with a centralized approach for maintaining reachability and forwarding information (also called network control), according to some embodiments of the invention. Specifically, FIG. 10D illustrates network elements (NEs) 1070A-H with the same connectivity as the NDs 1000A-H of FIG. 10A.

FIG. 10D illustrates that the distributed approach 1072 distributes responsibility for generating the reachability and forwarding information across the NEs 1070A-H; in other words, the process of neighbor discovery and topology discovery is distributed.

For example, where the special-purpose network device 1002 is used, the control communication and configuration module(s) 1032A-R of the ND control plane 1024 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 1070A-H (e.g., the processor(s) 1012 executing the control communication and configuration module(s) 1032A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1024. The ND control plane 1024 programs the ND forwarding plane 1026 with information (e.g., adjacency and route information) based on the routing structure(s). For example, the ND control plane 1024 programs the adjacency and route information into one or more forwarding table(s) 1034A-R (e.g., Forwarding Information Base (FIB), Label Forwarding Information Base (LFIB), and one or more adjacency structures) on the ND forwarding plane 1026. For layer 2 forwarding, the ND can store one or more bridging tables that are used to forward data based on the layer 2 information in that data. While the above example uses the special-purpose network device 1002, the same distributed approach 1072 can be implemented on the general purpose network device 1004 and the hybrid network device 1006.

FIG. 10D illustrates that a centralized approach 1074 (also known as software defined networking (SDN)) that decouples the system that makes decisions about where traffic is sent from the underlying systems that forwards traffic to the selected destination. The illustrated centralized approach 1074 has the responsibility for the generation of reachability and forwarding information in a centralized control plane 1076 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1076 has a south bound interface 1082 with a data plane 1080 (sometime referred to the infrastructure layer, network forwarding plane, or forwarding plane (which should not be confused with a ND forwarding plane)) that includes the NEs 1070A-H (sometimes referred to as switches, forwarding elements, data plane elements, or nodes). The centralized control plane 1076 includes a network controller 1078, which includes a centralized reachability and forwarding information module 1079 that determines the reachability within the network and distributes the forwarding information to the NEs 1070A-H of the data plane 1080 over the south bound interface 1082 (which may use the OpenFlow protocol). Thus, the network intelligence is centralized in the centralized control plane 1076 executing on electronic devices that are typically separate from the NDs.

In some embodiments, the networking controller 1078 can include the resource manager 1081 as described herein, which is executed by the centralized control plane 1076. In some embodiments the SDN controller and similar can be similarly stored and executed.

For example, where the special-purpose network device 1002 is used in the data plane 1080, each of the control communication and configuration module(s) 1032A-R of the ND control plane 1024 typically include a control agent that provides the VNE side of the south bound interface 1082. In this case, the ND control plane 1024 (the processor(s) 1012 executing the control communication and configuration module(s) 1032A-R) performs its responsibility for participating in controlling how data (e.g., packets) is to be routed (e.g., the next hop for the data and the outgoing physical NI for that data) through the control agent communicating with the centralized control plane 1076 to receive the forwarding information (and in some cases, the reachability information) from the centralized reachability and forwarding information module 1079 (it should be understood that in some embodiments of the invention, the control communication and configuration module(s) 1032A-R, in addition to communicating with the centralized control plane 1076, may also play some role in determining reachability and/or calculating forwarding information—albeit less so than in the case of a distributed approach; such embodiments are generally considered to fall under the centralized approach 1074, but may also be considered a hybrid approach).

While the above example uses the special-purpose network device 1002, the same centralized approach 1074 can be implemented with the general purpose network device 1004 (e.g., each of the VNE 1060A-R performs its responsibility for controlling how data (e.g., packets) is to be routed (e.g., the next hop for the data and the outgoing physical NI for that data) by communicating with the centralized control plane 1076 to receive the forwarding information (and in some cases, the reachability information) from the centralized reachability and forwarding information module 1079; it should be understood that in some embodiments of the invention, the VNEs 1060A-R, in addition to communicating with the centralized control plane 1076, may also play some role in determining reachability and/or calculating forwarding information—albeit less so than in the case of a distributed approach) and the hybrid network device 1006. In fact, the use of SDN techniques can enhance the NFV techniques typically used in the general purpose network device 1004 or hybrid network device 1006 implementations as NFV is able to support SDN by providing an infrastructure upon which the SDN software can be run, and NFV and SDN both aim to make use of commodity server hardware and physical switches.

FIG. 10D also shows that the centralized control plane 1076 has a north bound interface 1084 to an application layer 1086, in which resides application(s) 1088. The centralized control plane 1076 has the ability to form virtual networks 1092 (sometimes referred to as a logical forwarding plane, network services, or overlay networks (with the NEs 1070A-H of the data plane 1080 being the underlay network)) for the application(s) 1088. Thus, the centralized control plane 1076 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 10D shows the distributed approach 1072 separate from the centralized approach 1074, the effort of network control may be distributed differently or the two combined in certain embodiments of the invention. For example: 1) embodiments may generally use the centralized approach (SDN) 1074, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1074, but may also be considered a hybrid approach.

While FIG. 10D illustrates the simple case where each of the NDs 1000A-H implements a single NE 1070A-H, it should be understood that the network control approaches described with reference to FIG. 10D also work for networks where one or more of the NDs 1000A-H implement multiple VNEs (e.g., VNEs 1030A-R, VNEs 1060A-R, those in the hybrid network device 1006). Alternatively or in addition, the network controller 1078 may also emulate the implementation of multiple VNEs in a single ND. Specifically, instead of (or in addition to) implementing multiple VNEs in a single ND, the network controller 1078 may present the implementation of a VNE/NE in a single ND as multiple VNEs in the virtual networks 1092 (all in the same one of the virtual network(s) 1092, each in different ones of the virtual network(s) 1092, or some combination). For example, the network controller 1078 may cause an ND to implement a single VNE (a NE) in the underlay network, and then logically divide up the resources of that NE within the centralized control plane 1076 to present different VNEs in the virtual network(s) 1092 (where these different VNEs in the overlay networks are sharing the resources of the single VNE/NE implementation on the ND in the underlay network).

Figure 10E:
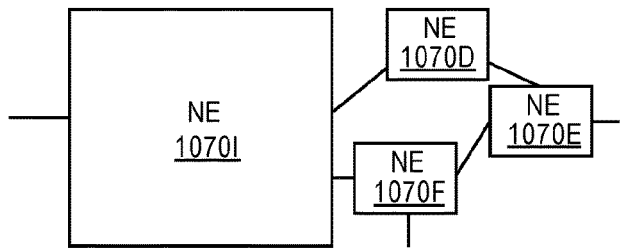
FIG. 10E illustrates the simple case of where each of the NDs implements a single NE, but a centralized control plane has abstracted multiple of the NEs in different NDs into (to represent) a single NE in one of the virtual network(s), according to some embodiments of the invention.
Figure 10F:
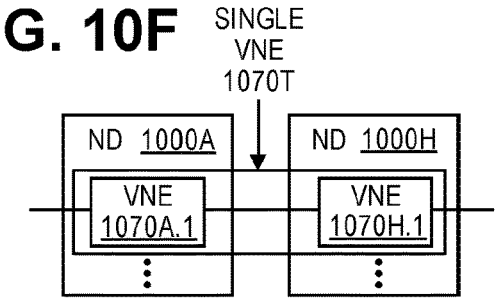
FIG. 10F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 10E and 10F respectively illustrate exemplary abstractions of NEs and VNEs that the network controller 1078 may present as part of different ones of the virtual networks 1092. FIG. 10E illustrates the simple case of where each of the NDs 1000A-H implements a single NE 1070A-H (see FIG. 10D), but the centralized control plane 1076 has abstracted multiple of the NEs in different NDs (the NEs 1070A-C and G-H) into (to represent) a single NE 1070I in one of the virtual network(s) 1092 of FIG. 10D, according to some embodiments of the invention. FIG. 10E shows that in this virtual network, the NE 1070I is coupled to NE 1070D and 1070F, which are both still coupled to NE 1070E.

FIG. 10F illustrates a case where multiple VNEs (VNE 1070A.1 and VNE 1070H.1) are implemented on different NDs (ND 1000A and ND 1000H) and are coupled to each other, and where the centralized control plane 1076 has abstracted these multiple VNEs such that they appear as a single VNE 1070T within one of the virtual networks 1092 of FIG. 10D, according to some embodiments of the invention. Thus, the abstraction of a NE or VNE can span multiple NDs.

While some embodiments of the invention implement the centralized control plane 1076 as a single entity (e.g., a single instance of software running on a single electronic device), alternative embodiments may spread the functionality across multiple entities for redundancy and/or scalability purposes (e.g., multiple instances of software running on different electronic devices).

Figure 11:
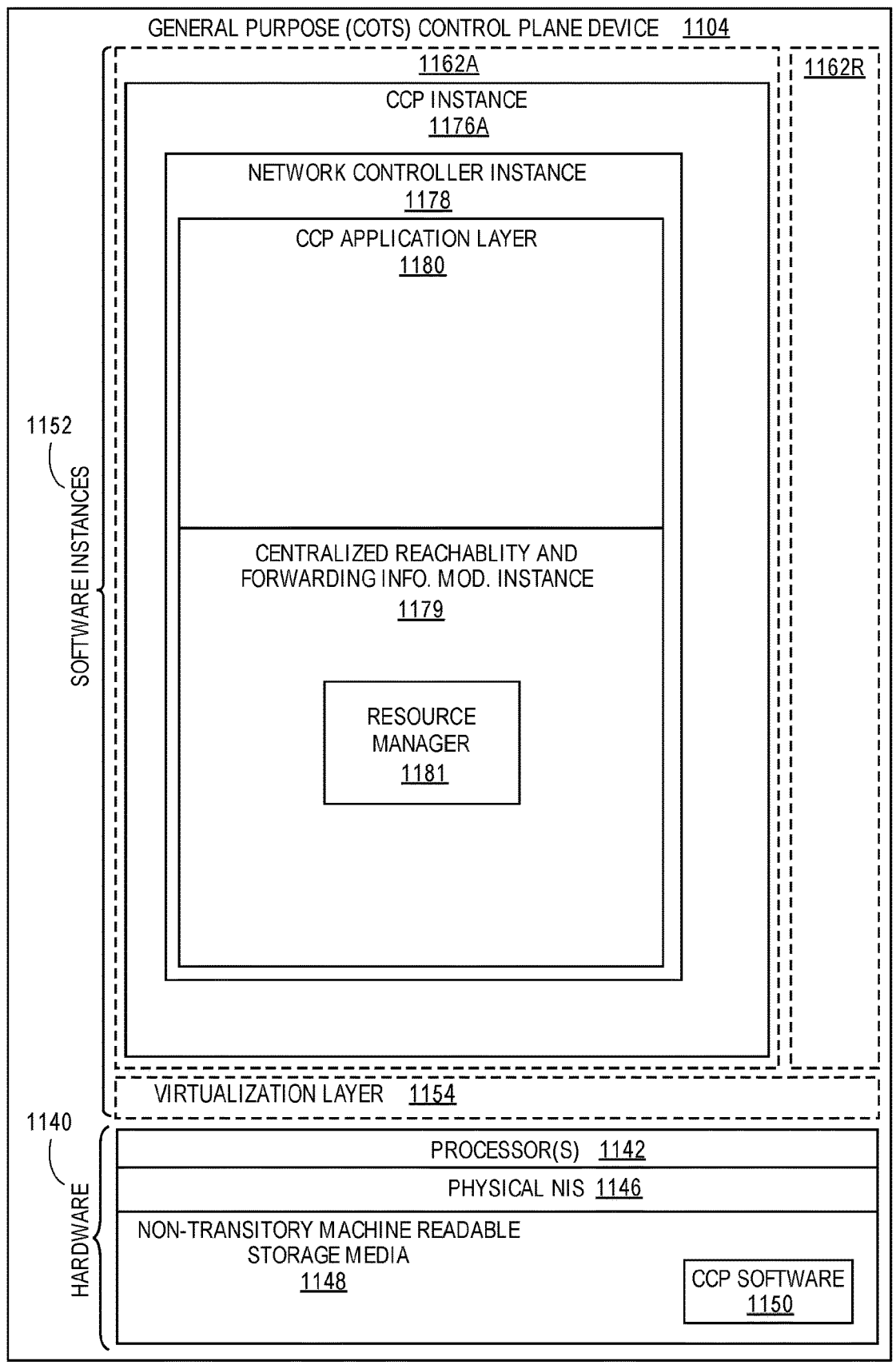
FIG. 11 illustrates a general purpose control plane device with centralized control plane (CCP) software 1150), according to some embodiments of the invention.

Similar to the network device implementations, the electronic device(s) running the centralized control plane 1076, and thus the network controller 1078 including the centralized reachability and forwarding information module 1079, may be implemented a variety of ways (e.g., a special purpose device, a general-purpose (e.g., COTS) device, or hybrid device). These electronic device(s) would similarly include processor(s), a set of one or more physical NIs, and a non-transitory machine-readable storage medium having stored thereon the centralized control plane software. For instance, FIG. 11 illustrates, a general purpose control plane device 1104 including hardware 1140 comprising a set of one or more processor(s) 1142 (which are often COTS processors) and physical NIs 1146, as well as non-transitory machine readable storage media 1148 having stored therein centralized control plane (CCP) software 1150.

In some embodiments, the non-transitory machine-readable storage media 1148 can include the resource manager 1181 as described herein, which is executed by the processors 1142. In some embodiments the SDN controller and similar can be similarly stored and executed.

In embodiments that use compute virtualization, the processor(s) 1142 typically execute software to instantiate a virtualization layer 1154 (e.g., in one embodiment the virtualization layer 1154 represents the kernel of an operating system (or a shim executing on a base operating system) that allows for the creation of multiple instances 1162A-R called software containers (representing separate user spaces and also called virtualization engines, virtual private servers, or jails) that may each be used to execute a set of one or more applications; in another embodiment the virtualization layer 1154 represents a hypervisor (sometimes referred to as a virtual machine monitor (VMM)) or a hypervisor executing on top of a host operating system, and an application is run on top of a guest operating system within an instance 1162A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1140, directly on a hypervisor represented by virtualization layer 1154 (in which case the unikernel is sometimes described as running within a LibOS virtual machine), or in a software container represented by one of instances 1162A-R). Again, in embodiments where compute virtualization is used, during operation an instance of the CCP software 1150 (illustrated as CCP instance 1176A) is executed (e.g., within the instance 1162A) on the virtualization layer 1154. In embodiments where compute virtualization is not used, the CCP instance 1176A is executed, as a unikernel or on top of a host operating system, on the "bare metal" general purpose control plane device 1104. The instantiation of the CCP instance 1176A, as well as the virtualization layer 1154 and instances 1162A-R if implemented, are collectively referred to as software instance(s) 1152.

In some embodiments, the CCP instance 1176A includes a network controller instance 1178. The network controller instance 1178 includes a centralized reachability and forwarding information module instance 1179 (which is a middleware layer providing the context of the network controller 1078 to the operating system and communicating with the various NEs), and an CCP application layer 1180 (sometimes referred to as an application layer) over the middleware layer (providing the intelligence required for various network operations such as protocols, network situational awareness, and user—interfaces). At a more abstract level, this CCP application layer 1180 within the centralized control plane 1076 works with virtual network view(s) (logical view(s) of the network) and the middleware layer provides the conversion from the virtual networks to the physical view.

The centralized control plane 1076 transmits relevant messages to the data plane 1080 based on CCP application layer 1180 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 1080 may receive different messages, and thus different forwarding information. The data plane 1080 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPV4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1080, the packet (or a subset of the packet header and content) is typically forwarded to the centralized control plane 1076. The centralized control plane 1076 will then program forwarding table entries into the data plane 1080 to accommodate packets belonging to the flow of the unknown packet. Once a specific forwarding table entry has been programmed into the data plane 1080 by the centralized control plane 1076, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of a resource manager in a mobile communication network to orchestrate execution of a first class of latency sensitive applications and a second class of latency sensitive applications where the second class of latency sensitive applications are less latency sensitive than the first class of latency sensitive applications, the method comprising:
    determining whether aggregated resource usage has exceeded or is predicted to exceed a threshold usage level for a first multi-access edge cloud (MEC);
    obtaining a list of the second class of latency sensitive applications executing at the first MEC;
    determining whether a second MEC in a cluster with the first MEC has resources to execute at least one application from the list of the second class of latency sensitive applications;
    transferring a state of a selected application of the second class of latency sensitive applications to the second MEC; and
    forwarding packets for the selected application from the first MEC to the second MEC by requesting a software defined network (SDN) controller update a data path between a user plane function (UPF) of a base station serving a user equipment (UE) using the selected application to forward the packets to the second MEC.

2. The method of claim 1, wherein the SDN controller executes at any one or more of the first MEC, a central cloud, and a session management function (SMF) in the mobile communication network.

3. The method of claim 1, wherein determining whether the aggregated resource usage has exceeded the predicted threshold usage level for the first MEC further comprising:
    determining that an application of the first class of latency sensitive applications has been added to the first MEC; and
    determining that the application of the first class of latency sensitive applications is predicted to cause an aggregate resource usage of the first MEC to exceed the threshold usage level.

4. The method of claim 1, further comprising:
    instantiating the selected application from the list of the second class of latency sensitive application at the second MEC, in response to determining the second MEC has the resources to execute the selected application.

5. The method of claim 1, wherein the resource manager executes at any one or more of the first MEC, or a centralized cloud.

6. The method of claim 1, further comprising:
    instantiating the selected application at a central cloud, in response to MECs in the cluster not having adequate resources to execute the selected application; and
    transferring the state of the selected application of the second class of latency sensitive applications to the central cloud.

7. The method of claim 1, wherein the aggregated resource usage increases to the threshold usage level in response to increased user usage of existing second class of latency sensitive applications at the first MEC.

8. The method of claim 1, wherein a user equipment utilizing at least one of the second class of latency sensitive applications transferred to the second MEC remains connected to a first base station associated with the first MEC and where the second MEC is connected to a second base station.

9. A non-transitory machine-readable medium comprising computer program code which, when executed by a computer, causes a resource manager in a mobile communication network to orchestrate execution of a first class of latency sensitive applications and a second class of latency sensitive applications, where the second class of latency sensitive applications are less latency sensitive than the first class of latency sensitive applications, by performing operations comprising:
    determining whether aggregated resource usage has exceeded or is predicted to exceed a threshold usage level for a first multi-access edge cloud (MEC);
    obtaining a list of the second class of latency sensitive applications executing at the first MEC;
    determining whether a second MEC in a cluster with the first MEC has resources to execute at least one application from the list of the second class of latency sensitive applications;
    transferring a state of a selected application of the second class of latency sensitive applications to the second MEC; and
    forwarding packets for the selected application from the first MEC to the second MEC by requesting a software defined network (SDN) controller update a data path between a user plane function (UPF) of a base station serving a user equipment (UE) using the selected application to forward the packets to the second MEC.

10. The non-transitory machine-readable medium of claim 9, wherein the SDN controller executes at any one or more of the first MEC, a central cloud, and a session management function (SMF) in the mobile communication network.

11. The non-transitory machine-readable medium of claim 9, wherein determining whether the aggregated resource usage has exceeded the predicted threshold usage level for the first MEC further comprising:
    determining that an application of the first class of latency sensitive applications has been added to the first MEC; and
    determining that the application of the first class of latency sensitive applications is predicted to cause the aggregate resource usage of the first MEC to exceed the threshold usage level.

12. A network device to operate as a resource manager in a mobile communication network to orchestrate execution of a first class of latency sensitive applications and a second class of latency sensitive applications, where the second class of latency sensitive applications are less latency sensitive than the first class of latency sensitive applications, the network device comprising:
    a storage medium having stored therein instructions to perform as the resource manager; and
    a processor coupled to the storage medium, the processor to execute the instructions to:
        determine whether aggregated resource usage has exceeded or is predicted to exceed a threshold usage level for a first multi-access edge cloud (MEC);
        obtain a list of the second class of latency sensitive applications executing at the first MEC;

determine whether a second MEC in a cluster with the first MEC has resources to execute at least one application from the list of the second class of latency sensitive applications;

transfer a state of a selected application of the second class of latency sensitive applications to the second MEC; and forward packets for the selected application from the first MEC to the second MEC by requesting a software defined network (SDN) controller update a data path between a user plane function (UPF) of a base station serving a user equipment (UE) using the selected application to forward the packets to the second MEC.

\* \* \* \* \*